US006309773B1

(12) United States Patent
Rock

(10) Patent No.: US 6,309,773 B1
(45) Date of Patent: Oct. 30, 2001

(54) SERIALLY-LINKED SERPENTINE FLOW CHANNELS FOR PEM FUEL CELL

(75) Inventor: Jeffrey Allan Rock, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/459,592

(22) Filed: Dec. 13, 1999

(51) Int. Cl.[7] ....................................................... H01M 8/02
(52) U.S. Cl. ................................................. 429/34; 429/30
(58) Field of Search .................................. 429/30, 34, 38, 429/39

(56) References Cited

U.S. PATENT DOCUMENTS

| 4,988,583 | 1/1991 | Watkins et al. ........................ 429/30 |
| 5,514,487 | * 5/1996 | Washington et al. ................... 429/39 |
| 6,099,984 | * 8/2000 | Rock ...................................... 429/39 |

FOREIGN PATENT DOCUMENTS

WO 96/12316   4/1996   (WO) .

OTHER PUBLICATIONS

USSN 09/016,127 filed Jan. 30, 1998 "Mirrored Serpentine Flow Channels for Fuel Cells", Jeffrey A. Rock.

* cited by examiner

Primary Examiner—Gabrielle Brouillette
Assistant Examiner—Monique Wills
(74) Attorney, Agent, or Firm—Lawrence B. Plant

(57) ABSTRACT

A PEM fuel cell having serpentine flow field channels comprising a plurality of serially-linked serpentine segments extending between inlet and exhaust manifolds. Each segment has an inlet leg, an exit leg, at least one medial leg therebetween and hairpin curved ends connecting the medial leg(s) to other legs of the segment. A bridging section of each flow channel connects adjacent segments of the same channel one to the next. The hairpin-curved ends of the medial legs are spaced from bridging sections by different distances depending on the difference in pressure in the bridging section and the hairpin-curved ends.

6 Claims, 5 Drawing Sheets

US 6,309,773 B1

SERIALLY-LINKED SERPENTINE FLOW CHANNELS FOR PEM FUEL CELL

TECHNICAL FIELD

This invention relates to PEM fuel cells and more particularly to the reactant flow fields therefor.

BACKGROUND OF THE INVENTION

Fuel cells have been proposed as a power source for many applications. One well known such fuel cell is the PEM (i.e., proton exchange membrane) fuel cell. PEM fuel cells include, in each cell thereof, a so-called "membrane-electrode-assembly" (hereafter MEA) comprising a thin (i.e., ca. 0.0015–0.007 inch), proton-conductive, polymeric, membrane-electrolyte having an anode electrode film (i.e., ca. 0.002 inch) formed on one face thereof, and a cathode electrode film (i.e., ca. 0.002 inch) formed on the opposite face thereof. Such membrane-electrolytes are well known in the art and are described in such U.S. Patents No. as U.S. Pat. Nos. 5,272,017 and 3,134,697, as well as in the Journal of Power Sources, Volume 29 (1990) pages 367–387, inter alia. In general, such membrane-electrolytes are made from ion-exchange resins, and typically comprise a perfluoronated sulfonic acid polymer such as NAFION™ available from the E.I. DuPont de Nemours & Co. The anode and cathode films, on the other hand, typically comprise (1) finely divided carbon particles, very finely divided catalytic particles supported on the internal and external surfaces of the carbon particles, and proton conductive material (e.g., NAFION™) intermingled with the catalytic and carbon particles, or (2) catalytic particles, sans carbon, dispersed throughout a polytetrafluoroethylene (PTFE) binder. One such MEA and fuel cell is described in U.S. Pat. No. 5,272,017 issued Dec. 21, 1993, and assigned to the assignee of the present invention.

The MEA is sandwiched between sheets of porous, gas-permeable, conductive material, known as a "diffusion layer", which press against the anode and cathode faces of the MEA and serve as (1) the primary current collectors for the anode and cathode, and (2) mechanical support for the MEA. Suitable such primary current collector sheets comprise carbon or graphite paper or cloth, fine mesh noble metal screen, and the like, through which the gas can move to contact the MEA, as is well known in the art.

The thusly formed sandwich is pressed between a pair of electrically conductive plates which serve as secondary current collectors for collecting the current from the primary current collectors and conducting current between adjacent cells (i.e., in the case of bipolar plates) internally of the stack, and externally of the stack in the case of monopolar plates at the ends of the stack. The secondary current collecting plates each contain at least one so-called "flow field" that distributes the fuel cell's gaseous reactants (e.g., $H_2$ and $O_2$/air) over the surfaces of the anode and cathode. The flow field includes a plurality of lands which engage the primary current collector and define therebetween a plurality of flow channels through which the gaseous reactants flow between a supply manifold at one end of a flow channel and an exhaust manifold at the other end of the channel. Serpentine flow channels are known and connect the supply and exhaust manifolds only after having made a number of hairpin turns and switch backs such that each leg of the serpentine flow channel borders at least one other leg of the same serpentine flow channel (e.g., see U.S. Pat. No. 5,108,849).

The pressure drop between the supply manifold and the exhaust manifold is of considerable importance in designing a fuel cell. One of the ways of providing a desirable pressure drop is to vary the length of the flow channels extending between the supply and exhaust manifolds. Serpentine channels have been used heretofore to vary the length of the flow channels. Serpentine channels are designed to allow some limited gas movement between adjacent legs of the same channel via the diffusion layer so as to expose the MEA confronting the land separating the legs to reactant. In this regard, gas can flow from an upstream leg of the channel (i.e. where pressure is higher) to a downstream leg of the same channel (i.e. where gas pressure is lower) by moving through the diffusion layer over/under the land that separates the upstream leg from the downstream leg of the flow channel. However, when the legs of a channel are too long, an excessive pressure drop can occur between adjacent legs of the same flow channel or between the ends of the legs (i.e. where they turn to adjoin the next adjacent leg) and/or an adjacent supply or exhaust manifold. Such excessive pressure drop can, in turn, result in the gaseous reactant excessively short circuiting between the adjacent legs, or ends and manifolds, rather than flowing through the full length of the channel. Such flow is considered to be excessive when it exceeds the amount of reactant that can be reacted on the MEA confronting the land between the legs.

SUMMARY OF THE INVENTION

A flow channel configuration that has relatively low pressure drop between adjacent legs of the same channel and between the ends of the legs and adjacent supply/exhaust manifolds.

More specifically, the present invention overcomes the aforesaid prior art problem by providing a flow channel that is subdivided into a plurality of serially-arranged segments or stages, each of which segments has its own serpentine configuration whose legs are relatively short. As a result very little pressure drop exists (a) between adjacent legs of the same channel, (b) between the ends of the legs and adjacent bridging sections of the same channel, or (c) manifolds adjacent the ends of the legs. The present invention is an improvement to PEM fuel cells of the general type which comprise (1) a proton exchange membrane having opposing cathode and anode faces on opposite sides thereof, (2) a gas-permeable, electrically-conductive cathode current collector engaging the cathode face, (3) a gas-permeable electrically-conductive anode current collector engaging the anode face, and (4) a current-collecting plate engaging at least one of the gas-permeable collectors and defining a gas flow field that confronts that gas-permeable collector. The improvement involves a flow field that comprises a plurality of lands that engage the current collector and define a plurality of substantially equal-length serpentine gas flow channels, each of which comprises a plurality of serially-linked serpentine segments that lie in a first general direction extending between a gas supply manifold and gas exhaust manifold. Each segment has: an inlet leg for receiving gas into the segment at a first pressure; an exit leg for exhausting from said segment at a second pressure less than said first pressure; and at least one medial leg intermediate the inlet and exit legs. Several medial legs may be used to increase the pressure drop from one end of a channel to the other. The inlet, exit and medial leg(s) for each channel at least in part border at least one other leg of the same channel. A reverse turn (e.g. hairpin curve) in the channel at each end of the medial leg(s) connects the medial leg(s) to adjacent legs of the same channel. In one embodiment of the invention, each channel includes at least three serpentine segments serially arranged in the general direction extending between the supply and exhaust manifolds. A bridging section of each channel extends in a second general direction transverse the first general direction, and couples the exit leg of one segment to the inlet leg of the next-adjacent segment downstream of the one segment (i.e. in the direction of the gas flow through the channel). Most preferably, the end of the medial leg closest to the inlet leg of the one segment (i.e. high pressure region) is spaced farther from the bridging section than the end of the medial leg closest to the exit leg of the same segment (i.e. low pressure region) to reduce gas bypass into the bridging section from the one segment. The ends of the medial legs are similarly spaced from adjacent supply of exhaust manifolds. Preferably, adjacent channels are mirror images of each other such that the inlet legs of adjacent channels border each other and the exit legs of adjacent channels border each other, but the inlet legs do not border the exit legs for the same reasons as set forth in copending U.S. patent application Ser. No. 09/016,127 filed Jan. 30, 1998 in the name of Jeffrey Rock, and assigned to the assignee of the present application.

BRIEF DESCRIPTION OF THE DRAWINGS

The invention will be better understood when considered in the light of the following detailed description of specific embodiments thereof which are described hereinafter in conjunction with the several figures in which.

DESCRIPTION OF THE PREFERRED EMBODIMENT

Figure 1:
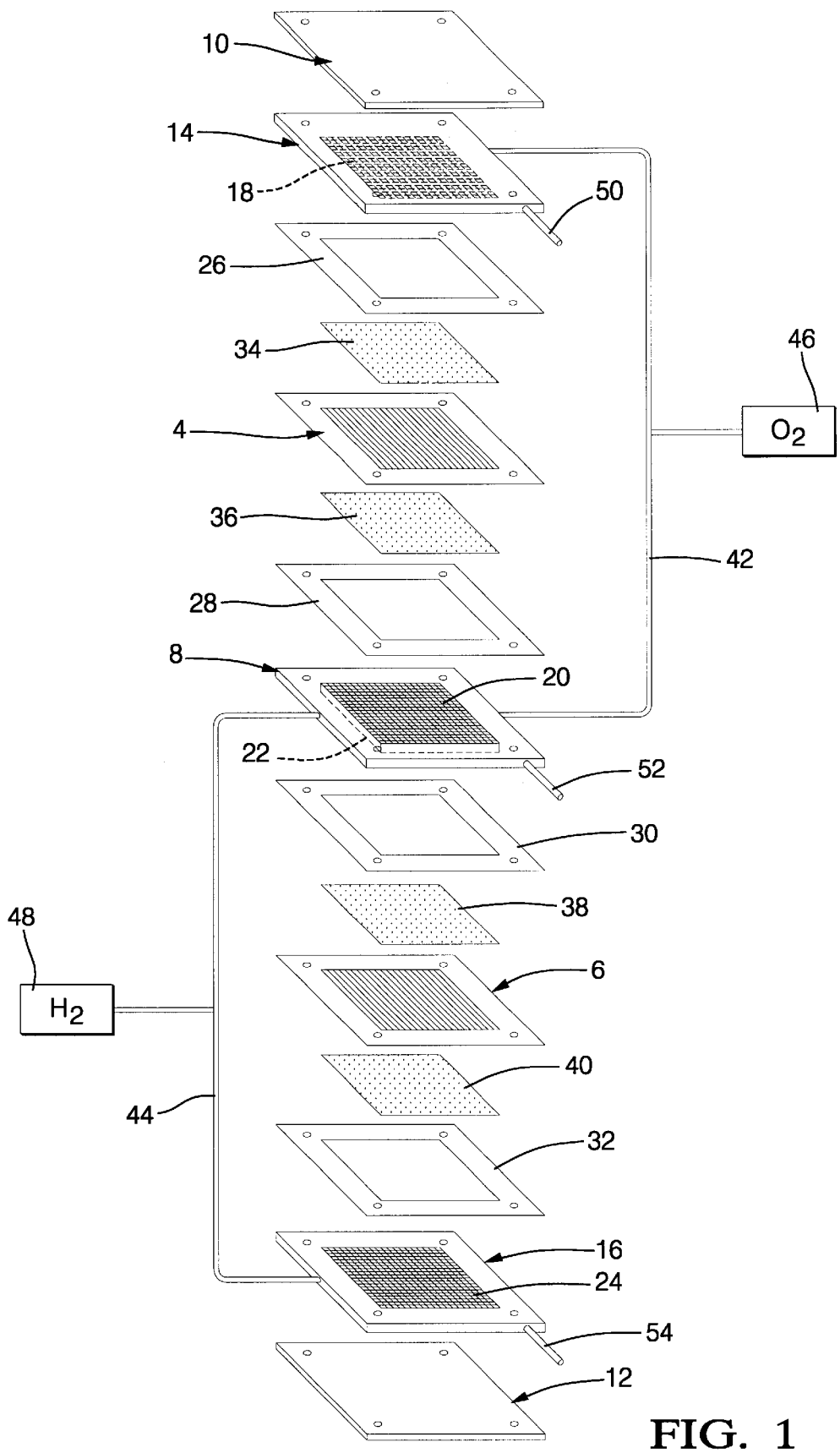
FIG. 1 is a schematic, isometric, exploded illustration of a PEM fuel cell.

FIG. 1 depicts a two cell, bipolar, PEM fuel cell stack having a pair of membrane-electrode-assemblies (MEAs) 4 and 6 separated from each other by an electrically conductive, liquid-cooled, bipolar plate 8. The MEAs 4 and 6, and bipolar plate 8, are stacked together between stainless steel clamping plates 10 and 12, and monopolar end contact plates 14 and 16. The monopolar end contact plates 14 and 16, as well as the bipolar plate 8, each contain flow fields 18, 20, 22 and 24 comprising a plurality of flow channels formed in the faces of the plates for distributing fuel and oxidant gases (i.e., $H_2$ & $O_2$) to the anode and cathode faces of the MEAs 4 and 6. Nonconductive gaskets 26, 28, 30, and 32 provide seals and electrical insulation between the several plates of the fuel cell stack. Porous, gas permeable, electrically conductive sheets 34, 36, 38 and 40, known as diffusion layers, press up against the electrode faces of the MEAs 4 and 6 and serve as primary current collectors for the electrodes as well as mechanical supports for the MEAs, especially at locations where the MEAs 4 and 6 span flow channels in the flow field and are otherwise unsupported. Suitable primary current collectors include carbon/graphite paper/cloth, fine mesh noble metal screens, open cell noble metal foams, and the like which conduct current from the electrodes while allowing gas to pass therethrough to reset on the electrodes. The end contact elements 14 and 16 press up against the primary current collectors 34 and 40 respectively, while the bipolar plate 8 presses up against the primary current collector 36 on the anode face of MEA 4, and against the primary current collector 38 on the cathode face of MEA 6. Oxygen may be supplied to the cathode side of the fuel cell stack from a storage tank 46 via appropriate supply plumbing 42, while hydrogen may be supplied to the anode side of the fuel cell from a storage tank 48, via appropriate supply plumbing 44. Preferably, the $O_2$ tank 46 is eliminated and air is supplied to the cathode side from the ambient. Preferably the $H_2$ tank 48 is eliminated and hydrogen supplied to the anode from a reformer or other form of fuel processor which catalytically generates hydrogen from methanol or a liquid hydrocarbon (e.g., gasoline). Exhaust plumbing (not shown) for both the $H_2$ and $O_2$/air sides of the MEAs is also provided for removing $H_2$-depleted anode gas from the anode flow field and $O_2$-depleted cathode gas from the cathode flow field. Additional plumbing 50, 52 and 54 is provided for supplying liquid coolant to the bipolar plate 8 and end plates 14 and 16, as may be needed. Appropriate plumbing for exhausting coolant from the plate 8 and end plates 14 and 16 is also provided, but not shown.

Figure 2:
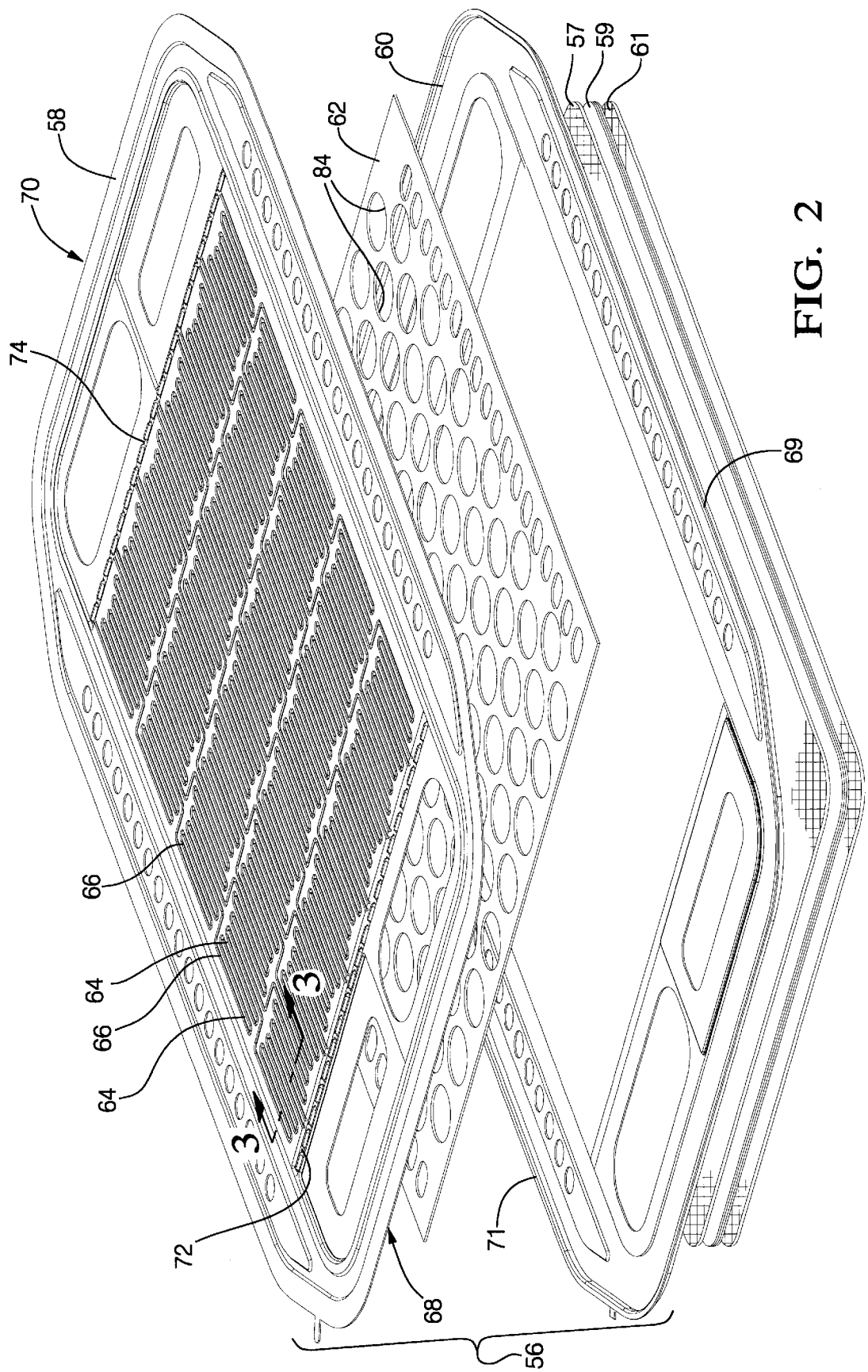
FIG. 2 is an isometric, exploded view of an MEA and bipolar plate of a fuel cell stack, anode side up.

FIG. 2 is an isometric, exploded view of a bipolar plate 56, first primary porous current collector 57, MEA 59 and second primary porous current collector 61 as they are stacked together in a fuel cell. A second bipolar plate (not shown) would underlie the second primary current collector 61 to form one complete cell. Similarly, another set of primary current collectors and MEA (not shown) will overlie the upper sheet 58. The bipolar plate 56 comprises a first exterior metal sheet 58, a second exterior metal sheet 60, and an optional interior spacer metal sheet 62 which is brazed interjacent the first metal sheet 58 and the second metal sheet 60. The metal sheets 58, 60 and 62 are made as thin as possible (e.g., about 0.002–0.02 inches thick), may be formed by stamping, by photo etching (i.e., through a photolithographic mask) or any other conventional process for shaping sheet metal. The external sheet 58 is formed so as to provide a reactant gas flow field characterized by a plurality of lands 64 which define therebetween a plurality of serpentine gas flow channels 66 through which the fuel cell's reactant gases (i.e., $H_2$ or $O_2$) flow in a tortuous path from near one edge 68 of the bipolar plate to near the opposite edge 70 thereof. When the fuel cell is fully assembled, the lands 64 press against the primary current collectors 61 which, in turn, press against the MEA 59. In operation, current flows from the primary current collector through the lands 64 and thence through the stack. The reactant gas is supplied to channels 66 from a header or supply manifold groove 72 that lies adjacent the edge 68 of the plate 56 at one end of the flow field, and exits the channels 66 via an exhaust manifold groove 74 that lies adjacent the opposite edge 70 of the fuel cell at the other end of the flow field. Alternatively the supply and exhaust manifolds could lie adjacent the same edge (i.e. 68 or 70) of the plate 56. The underside of the metal sheet 58 includes a plurality of ridges (not shown) which define therebetween a plurality of grooves (not shown) through which coolant passes during the operation of the fuel cell.

Metal sheet 60 is similar to sheet 58. The internal (i.e., coolant side) of sheet 60 is shown in FIG. 2. The coolant side of the flow field includes a plurality of ridges (not shown) defining therebetween a plurality of grooves (not shown) through which coolant flows from one edge 69 of the bipolar plate to the opposite edge 71. Like sheet 58, the external side of the sheet 60 will have a plurality of lands (not shown)

thereon defining a plurality of channels (not shown) through which the reactant gases pass. An interior metal spacer sheet 62 is interjacent the exterior sheets 58 and 60 and includes a plurality of apertures 84 therein to permit coolant to flow between the grooves on the coolant-side of sheet 60 and the grooves on the coolant-side of sheet 58 thereby breaking laminar boundary layers and affording turbulence, and hence more effective heat exchange with the inside faces of the exterior sheets 58 and 60 respectively. The several sheets 58, 60 and 62 are preferably brazed together.

Figure 3:
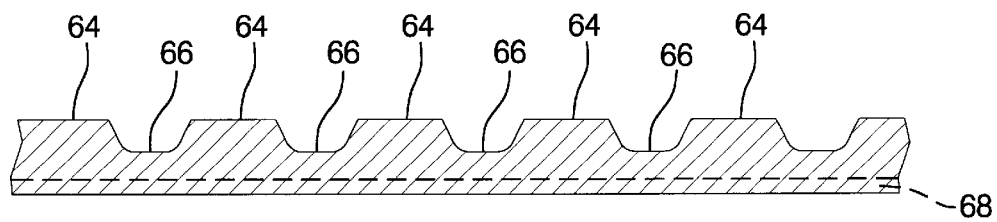
FIG. 3 is an enlarged sectional view in the direction 3—3 of FIG. 2.

FIG. 3 is a sectioned view in the direction 3—3 of the plate 58 of FIG. 2 and shows a plurality of lands 64, reactant flow channels 66 defined by the lands 64, and cooling grooves 68 on the underside of plate 58 for flowing coolant in a direction transverse the direction of reactant flow in channels 66.

Figure 5:
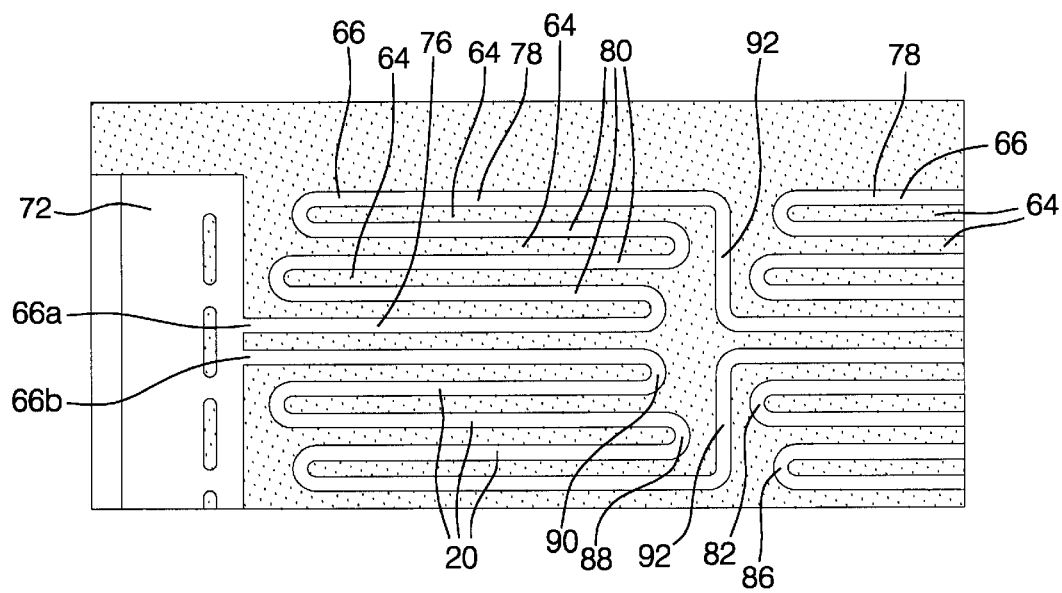
FIG. 5 is an enlarged view of the circled portion of FIG. 4.
Figure 4:
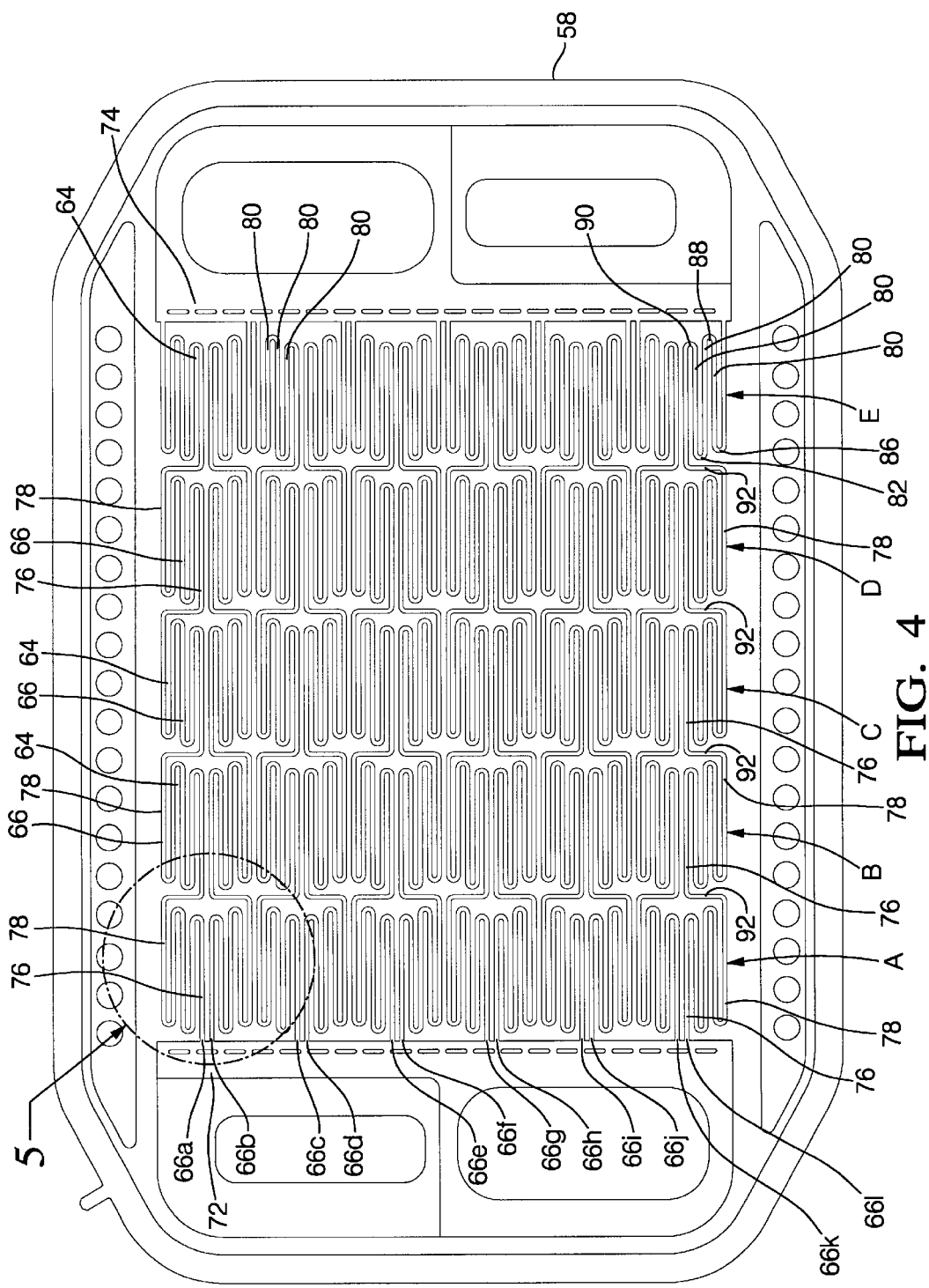
FIG. 4 is a plan view of the bipolar plate of FIG. 2.

FIG. 4 best depicts a cathode flow field configuration in accordance with the present invention, and is a two dimensional view of the plate 58 of FIG. 2. See also FIG. 5 for a blow-up of the circled portion of FIG. 4. The flow field comprises a plurality of flow channels 66a–66j connected at one end to an inlet supply manifold 72 that distributes a gaseous reactant (e.g. air) to the flow channels 66a–66j, and at the other end to an exhaust manifold 74 for collecting the gaseous reactant exiting the flow channels 66a–66j. Each flow channel 66a–66j comprises a plurality of segments A–E linked to each other, and extending in the general direction between the inlet supply and exhaust manifolds such that gas entering a given channel 66a–66j from the inlet supply manifold 72 flows through all of the segments A–E thereof, in sequence until it exits the flow channels 66a–66j into the exhaust manifold 74. Each segment A–E has a serpentine configuration of its own and comprises an inlet leg 76 through which gas flows into a segment A–E, an exit leg 78 through which gas flows out of the segment A–E, and at least one medial leg 80 lying between the inlet and exit legs 76 and 78 respectively. Each leg (i.e. inlet, medial or exit) of a given channel borders at least one other leg of the same channel. The medial legs border two legs of the same channel. Reverse turns 82, 86, 88 and 90 at each end of the medial leg(s) 80 connect that medial leg 80 to the next adjacent leg(s) of the same flow channel whether it be to an inlet leg 76, an exit leg 78 or another medial leg 80. By breaking each flow channel into serially-linked segments each having its own serpentine configuration, the legs of each serpentine channel become relatively short and hence the pressure drop between one leg and the next adjacent leg of the same channel is relatively small thereby discouraging short-circuiting from one leg to the next over/under an intervening land. Similarly, the pressure drop between the ends of the medial legs 82, 86, 88 & 90 and adjacent sections of the same channel, or adjacent supply or exhaust manifolds, is relatively small.

Each serpentine segment A–E is connected to the next segment in the series by a bridging section 92 that connects the exit leg of a downstream segment to the inlet leg of an upstream segment. In the embodiment shown, the bridging section 92 extends in a direction transverse the general direction (i.e. from inlet manifold to exhaust manifold) that the flow channel extends. Preferably, the reverse-turned ends 82,86,88 & 90 of the medial legs each have different spacings from the bridging sections 92, to further discourage short-circuiting thereat. In this regard, there is a greater spacing between the hairpin curved ends and the bridging section 90 at those ends 86 and 90 where the pressure drop ($\Delta P$) therebetween is greatest, and lesser spacing at those ends 82 and 88 where the $\Delta P$ is lesser. Hence for example, as between segments D and E (see FIG. 4) the hairpin-curved end 82 is closer to the bridging section 92 than the hairpin-curved end 86 since end 86 is at a lower pressure than the pressure at end 82, resulting in a greater pressure drop between the bridging section 92 and end 86 than between the bridging section 92 and end 82. The same spacing exists for the ends of the medial legs of segment A and the supply manifold 72 as well as the ends of the medial legs of segment E and the exhaust manifold 74.

Figure 6:
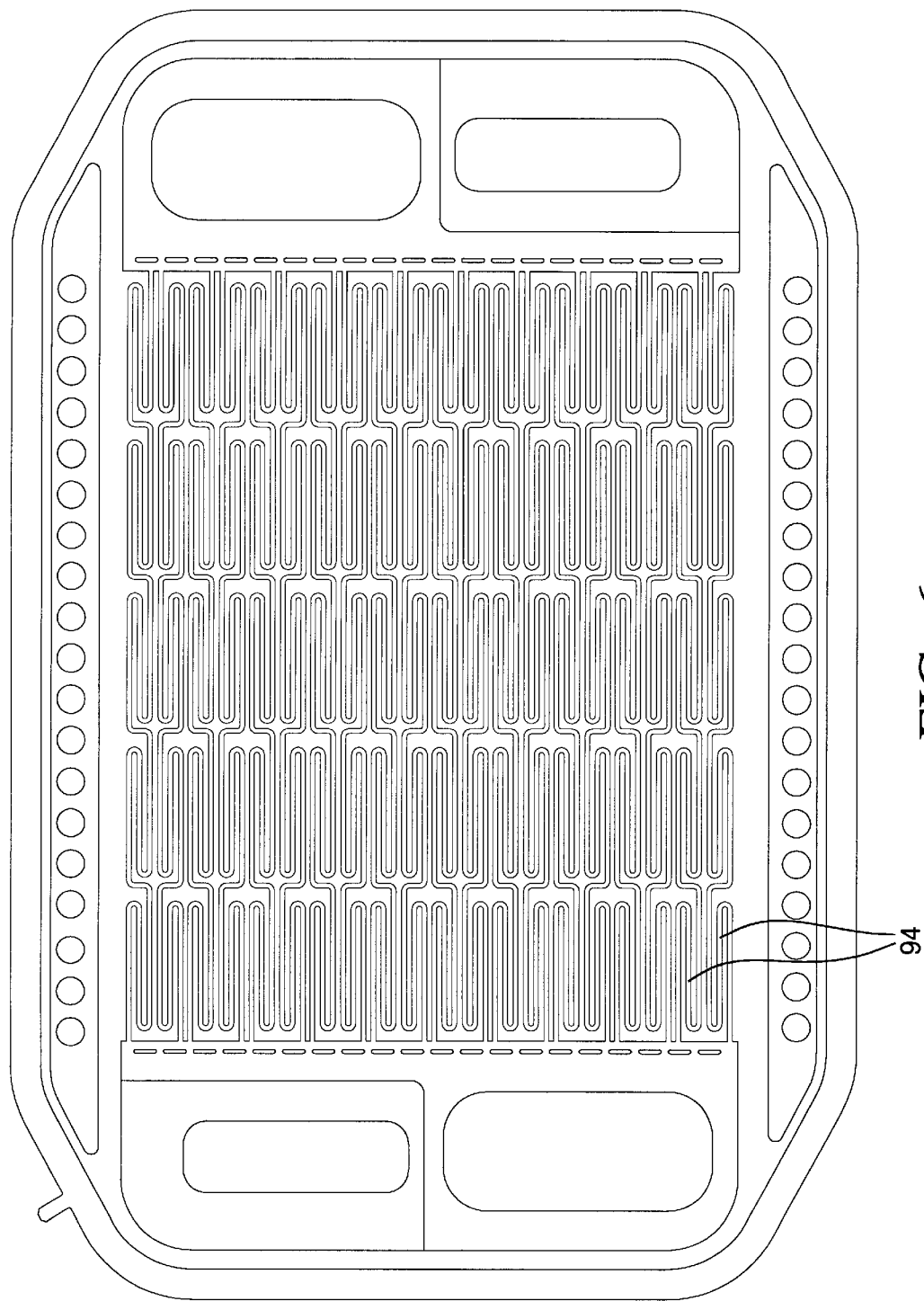
FIG. 6 is a view like that of FIG. 4 showing an alternative embodiment of the present invention suitable for the cathode side.

FIG. 6 is similar to FIG. 4 except that each channel has fewer medial legs 94 (only one medial leg shown) than in FIG. 4, and is particularly useful for handling the cathode (i.e. $O_2$) reactant. In this regard, the FIG. 4 configuration utilizing multiple medial legs is particularly useful for handling the anode reactant, hydrogen. By having differently configured flow channels on opposite sides of the MEA it is possible to maintain substantially the same pressure drop between the inlet and outlet manifolds for both the $H_2$ and the air when each are supplied to the fuel cell at about the same pressure without creating too high a pressure drop across the MEA.

While the invention has been disclosed in terms on one specific embodiment thereof, it is not intended that it be limited thereto but rather only to the extent set forth hereafter in the claims which follow.

What is claimed is:

1. In a PEM fuel cell comprising (1) a proton exchange membrane having opposing cathode and anode faces on opposite sides of said membrane, (2) a gas-permeable, electrically conductive cathode current collector engaging said cathode face, (3) a gas-permeable, electrically-conductive anode current collector engaging said anode face, and (4) a current-collecting plate engaging at least one of said gas-permeable cathode and anode current collectors and defining a gas flow field confronting said one gas-permeable collector, said flow field comprising a plurality of lands engaging said one current collector and defining a plurality of substantially equal-length serpentine gas flow channels, the improvement wherein each of said channels comprises (a) a plurality of serially-linked serpentine segments that lie in a first general direction extending between a gas supply manifold and a gas exhaust manifold, said segments each having an inlet leg for receiving gas into the segment at a first pressure, an exit leg for exhausting said gas from said segment at a second pressure less than said first pressure, at least one medial leg intermediate said inlet and exit legs, said inlet, exit and medial legs for each channel at least in part bordering at least one other leg of the same channel, and a reverse turn at each end of said medial leg connecting said medial leg to adjacent legs of the same channel, and (b) a bridging section coupling the exit leg of one segment to the inlet leg of the next adjacent segment downstream of said one segment in the same channel.

2. The PEM fuel cell according to claim 1 wherein said segments each include a plurality of said medial legs intermediate said inlet and exit legs.

3. The PEM fuel cell according to claim 1 wherein each channel comprises at least three said serially-linked serpentine segments.

4. The PEM fuel cell according to claim 1 wherein said inlet leg lies along a first side of said segment and said exit leg lies along a second side of said segment opposite said first side, and said bridging section extends in a second general direction transverse said first general direction.

5. The PEM fuel cell according to claim 4 wherein the end of the medial leg that, in operation, is at a pressure closest to the pressure in said bridging section is spaced from said bridging section by a first distance, and the end of the medial leg that, in operation, is at a pressure farthest from the pressure in said bridging section is spaced from the bridging section by a second distance which is less than said first distance.

6. The PEM fuel cell according to claim 1 wherein the cathode current-collecting plate defines a flow field having flow channels that are shorter in length than the flow channels defined by the anode current-collecting plate so as to permit a pressure drop between the supply and exhaust manifolds for the cathode that is substantially the same as the pressure drop between the supply and exhaust manifolds for the anode when the pressure of the anode and cathode reactants supplied to said fuel cell are substantially the same.

\* \* \* \* \*